E. Heaton,

Shank Spring.

No. 4,081. Reissued July 26. 1870.

Witnesses
A. J. Tibbits
J. H. Shumway

E. Heaton
Inventor
By his Attorney.
Thos. E. Earle

N. PETERS, PHOTO-LITHOGRAPHER, WASHINGTON, D. C.

United States Patent Office.

EDWARD HEATON, OF NEW HAVEN, CONNECTICUT.

*Letters Patent No.* 75,266, *dated March* 10, 1868; *reissue No.* 4,081, *dated July* 26, 1870.

IMPROVEMENT IN SHANK-SPRINGS.

The Schedule referred to in these Letters Patent and making part of the same.

*To all whom it may concern:*

Figure 1:
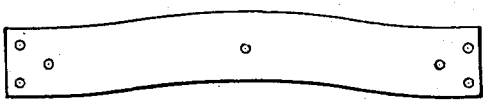
Figure 2:
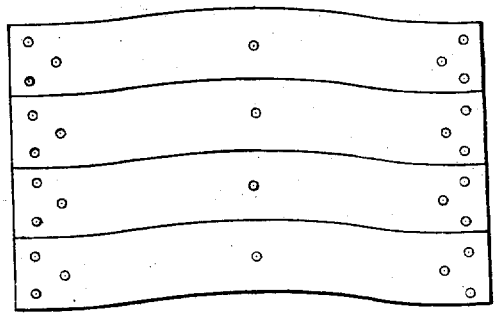

Be it known that I, EDWARD HEATON, of New Haven, in the county of New Haven and State of Connecticut, have invented a new Improvement in Shank Springs; and I do hereby declare the following, when taken in connection with the accompanying drawing and the letters of reference marked thereon, to be a full, clear, and exact description of the same, and which said drawing constitutes part of this specification, and represents in Figure 1, a single shank;

Figure 2, the manner of cutting; and in

Figure 3:
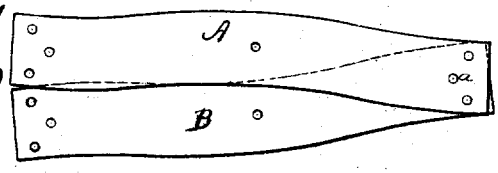

Figure 3, a diagram illustrating the position of the spring in the shank of the boot or shoe.

This invention relates to an improvement in steel springs, such as are inserted in boots and shoes, the object of the invention being to shape the spring so that one side up it will answer for a right, and the other side up for a left boot or shoe, at the same time to give to the spring the requisite curvature for support of the foot, and to produce the shank without waste of metal.

The invention consists in cutting the springs from sheet metal, the curvature of one side corresponding to the curvature of the opposite side, so as to prevent waste of metal, and at the same time that the springs may answer either for a right or left boot or shoe, according to which side up is used.

It is necessary to give to the springs a curve corresponding to the shape of the foot, in order that the support may come in line with the center of the foot, and consequently the reverse for right or left boots or shoes, as seen in fig. 3, the spring A being for a right boot, and B for a left, the point *a* being the same in both right and left.

Heretofore this curve or shape has been given by cutting the spring of different widths at different points in the spring, which necessitates no inconsiderable waste of metal, and also right and left springs, thus doubling the dies required for the manufacture of the springs, and the trouble of putting up in pairs for market.

To avoid this waste, and yet obtain the curve required, as well as to overcome the other difficulties mentioned, I form the spring as seen in fig. 1, the one edge being of reverse form, precisely as the other, so that one edge of one spring corresponds exactly to the opposite edge of another spring; that is to say, from a sheet of metal the springs are cut, as seen in fig. 2, and this may be done by a shear having its edge to correspond to the edge of the springs, and the metal fed into the shears.

The springs are successively cut from the sheet without any waste of metal, which saves a large expense in the cost of the dies, as each different-sized spring, as heretofore formed, required a die of precisely that size and form.

By turning the spring from one side up to the other it is changed from right to left, and *vice versa*, as seen in fig. 3, and the central line of the spring is of such a curve as to make the bearing of the foot central on the spring.

I claim as my invention—

As an article of manufacture, shank-springs cut or stamped from sheet metal, the opposite edges of which are similarly curved, substantially as described, so that the same spring may be employed for either a right or left boot or shoe.

EDWARD HEATON.

Witnesses:

J. H. SHUMWAY,

A. J. TIBBITS.